Aug. 6, 1968 H. W. MOORE 3,395,448
ARMATURE WINDING AND LEAD WIRE CONNECTING METHOD
Filed March 18, 1963 2 Sheets-Sheet 2
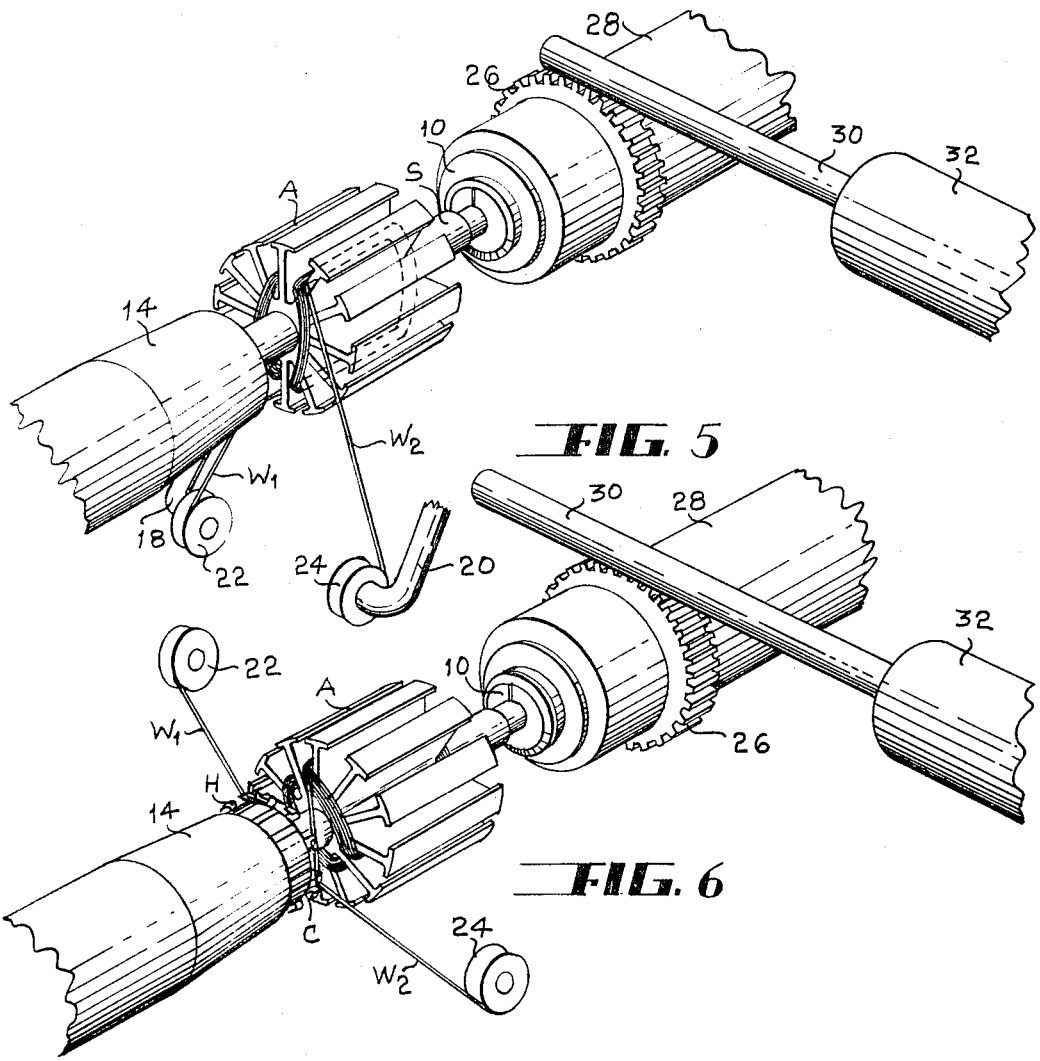
INVENTOR.
HARRY W. MOORE
BY
HIS ATTORNEYS

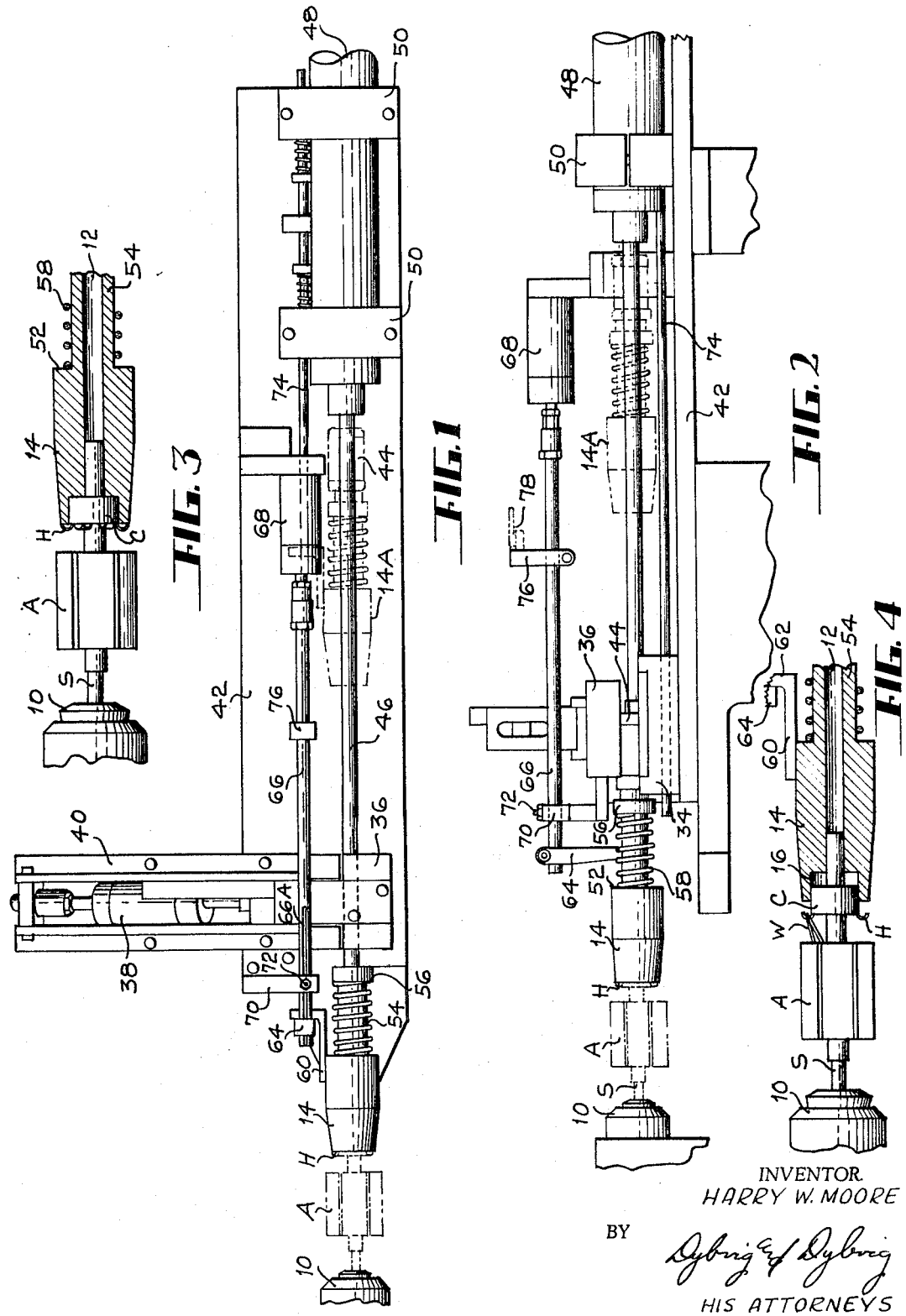

United States Patent Office 3,395,448
Patented Aug. 6, 1968

3,395,448
ARMATURE WINDING AND LEAD WIRE CONNECTING METHOD
Harry W. Moore, Dayton, Ohio, assignor to The Globe Tool and Engineering Company, Dayton, Ohio, a corporation of Ohio
Filed Mar. 18, 1963, Ser. No. 265,674
1 Claim. (Cl. 29—596)

This invention relates to a coil winding machine and more particularly to a method and apparatus for attaching coil lead wires passing from coils in a slotted armature core to commutator tangs, but is not necessarily so limited.

In my copending application Ser. No. 780,150, filed Dec. 12, 1958, now United States Patent No. 3,191,269, issued July 29, 1965, apparatus is described for attaching coil lead wires to commutator tangs including a tang shield for preventing the wire from which the coil is wound from being attached to the commutator tangs during the winding operation. Means are provided for deflecting a lead wire after a coil has been wound and simultaneously exposing the tanks such that the lead wire is deposited upon a preselected tang. The method described therein has numerous advantages. One important advantage is that the lead wires can conveniently be attached to tangs which are circumferentially offset from the coil to which they are attached. However, the degree of circumferential offset available is limited by the construction of the apparatus described therein, since it is possible to conveniently deflect the lead wires only through rather limited angles.

An object of this invention is to provide an improved apparatus for attaching coil lead wires to commutator tangs.

A more specific object of this invention is to provide improved apparatus for attaching lead wires to commutator tangs circumferentially offset from the coil to which the lead wire is attached by an amount greater than available in the past. As will become apparent below, this object is accomplished by rotating the armature core rather than by deflecting the coil lead wires.

A further object of this invention is to provide an improved method for attaching lead wires to commutator tangs.

Other objects and advantages reside in the construction of parts, the combination thereof, the method of manufacture and the mode of operation, as will become more apparent from the following description.

Referring to the drawings:

FIGURE 1 is a plan view of a portion of apparatus made in accordance with this invention.

FIGURE 2 is a partial side elevational view of the apparatus of FIGURE 1.

FIGURE 3 is an enlarged side view with portions in cross-section of structure for engaging an armature shaft and a commutator made in accordance with this invention.

FIGURE 4 is an enlarged view similar to FIGURE 3, but showing the parts in a different operating position.

FIGURE 5 is a partial perspective view of the elements shown in FIGURE 3 and, in addition, indicates the manner in which coil lead wires are attached to commutator tangs by rotating flier mechanisms and schematically illustrates means for rotating an armature core.

FIGURE 6 is a perspective view similar to FIGURE 5, but showing the parts in a different operating position.

Referring to FIGURES 3, 4, 5 and 6, an armature core A and a commutator C are shown mounted on a common shaft S. One end of the shaft S is shown supported by a collet mechanism 10, the construction and operation of which may be conventional. The other end of the shaft S is received within a bore 12 of a tubular commutator shield 14. The outer end of the bore 12 is enlarged to form a cup 16, which snugly receives the commutator C. The armature core A is of the conventional type having a plurality of circumferentially spaced radially extending coil receiving slots. The commutator C is of the type having a plurality of circumferentially spaced bars, each of which is provided with a tang H on the end of the commutator bars adjacent the armature core A. The tangs H are hooked away from the armature core A so that, as shown in FIGURE 4, a lead wire, designated W, leading away from the armature core A may be hooked thereon. The tanks H may be integral with the commutator bars or may be formed from separate pieces electrically connected to the commutator bars, as is well known to those skilled in the art.

Referring to FIGURES 5 and 6, two strands of wire, designated $W_1$ and $W_2$ therein, are wound to form coils in pairs of slots on the armature core A by means of flier mechanisms schematically shown at 18 and 20, respectively, each of which includes a wire guide or pulley, designated 22 and 24, respectively. Fliers of this type are commonly used in coil winding machines in association with suitable coil forms. An example of such coil winding machines is illustrated in my Patent No. 2,627,379. In accordance with this invention, the tubular shield 14 abuts the tangs H on the commutator C during the winding operation, thus preventing the wire strands $W_1$ and $W_2$ from engaging any of the tangs H. The relative position of the parts shown in FIGURE 5 are at the end of the winding of a pair of coils by the two flier mechanisms 18 and 20. At this time, it is desired to connect the portions of the strands $W_1$ and $W_2$ between the coils wound in the slots of the armature core A and the fliers 22 and 24 to a pair of tangs H on the commutator C.

A ring gear 26 is affixed to a sleeve 28, which in turn is connected to the collet 10. The specific connection is not illustrated. It is to be understood that the collet may be supported for rotation in any conventional manner. The ring gear 26 is engaged by a rack 30 driven by a hydraulic or pneumatic cylinder 32 so as to rotate the collet mechanism 10 in a counterclockwise direction as viewed in FIGURE 5 to that position shown in FIGURE 6. During rotation of the collet mechanism 10 and, accordingly, the armature shaft S along with the commutator C and armature core A mounted thereon, the flier mechanisms 18 and 20 remain in the position shown in FIGURE 5. Such rotation of the armature core A causes the wire portions $W_1$ and $W_2$ to pass adjacent a pair of spaced tangs H on the commutator C. After rotation of the armature core A, the shield 14 is retracted to expose the tangs as shown in FIGURE 6. Thereafter, the fliers 18 and 20 are rotated to partially hook the wire strands $W_1$ and $W_2$ about a pair of preselected tangs H. The shield 14 is then returned to the position shown in FIGURE 5, whereupon the strands $W_1$ and $W_2$ are mounted in engagement with the preselected tangs H. The collet 10, the shaft S, and the parts thereon, are then rotated back to the position shown in FIGURE 5. Thereafter, the armature core A is indexed to present a new pair of slots to be provided with coils by continued rotation of the fliers 18 and 20. The indexing of the armature core can be accomplished, for example, by the indexing mechanism described in my Patent No. 2,627,379. Of course, during such indexing, the collet clamp must be released. The foregoing steps are repeated until the desired number of coils have been wound in the commutator slots and their lead wires connected to the tangs H.

By following the method described above, the circumferential spacing between the slot from which a lead wire passes to the tang H upon which the lead wire is hooked is effectively limited only by the particular design of the finished armature desired. In other words, the armature core can be rotated through as great an angular distance as may be required by the design of the armature, since the rack 30 can be designed to rotate the ring gear 26 through any desired angle.

The specific construction of the mechanism for controlling the position of the shield 14 may take a variety of forms. FIGURES 1, 2 and 4 illustrate suitable mechanism for controlling the position of the shield 14 and providing support for an armature shaft. Referring especially to FIGURES 1 and 2, an armature assembly can be rested upon a pad 34 and held in position by a clamp 36, which is actuated by a clamping cylinder 38 mounted upon a bracket 40 upon a table 42. An armature core is so clamped to the pad 34 that its shaft is coaxial with the bore 12 within the shield 14. When an armature core is on the pad 34, the shield 14 is located in the position indicated by the dotted line 14A in FIGURES 1 and 2. The rearward end of the shield 14 is attached by an adapter 44 to a shield drive shaft 46 driven by a shield operating hydraulic or pneumatic cylinder 48 mounted by brackets 50 upon the table 42. Assuming the shield 14 to be in the dotted line position 14A shown in FIGURES 1 and 2, it is advanced by the cylinder 48 to the left into engagement with the commutator C and shaft S. For this purpose, the clamp 36 exerts sufficient pressure upon the armature core A that it remains stationary until the bottom face of the cup-shaped socket 16 is engaged with the rearward face of the commutator C. The armature assembly is then advanced to the left as viewed in FIGURES 1 and 2 until the free end of the shaft S engages the collet 10 which automatically clamps onto the shaft S. The parts are then in the full line position shown in FIGURES 1, 2 and 3 in readiness for the winding operation previously described.

At the end of a winding operation, the shield 14 is withdrawn in the following manner. Note that the shield 14 is designed to have an enlarged head portion which receives the commutator C and the end of the armature shaft S, which head portion provides an abutment surface 52 at its rearward end in surrounding relationship to a tubular rod portion 54 integral with the head portion. The rod portion 54 is slidably received within an enlarged cap portion 56 of the adapter 44. A compression spring 58 encircles the rod portion 54, coacting against the head portion 56 of the adapter and the abutment surface 52 of the shield 14, such that the shield 14 is normally in an extended position shown best in FIGURE 3. Suitable stop elements (not shown) within adapter 44 prevent the shield 14 from projecting further outwardly from the position shown in FIGURES 1 through 3. An L-shaped bracket 60 having a short leg portion 62 is connected to one side of the enlarged head portion of the shield 14 such that the leg portion 62 extends normal to the longitudinal axis of the shield. When the parts are in the full line position shown in FIGURES 1 and 2, the leg portion 62 is engaged by a shield operating arm 64 which is fixedly attached to a shield control shaft 66 driven by a shield control cylinder 68. The shaft 66 is supported by a bracket 70 near the outer or free end thereof having a set screw 72 passing therethrough which engages a keyway 66A in the shaft 66 preventing rotation thereof. In order to retract the shield 14 from shielding engagement with the tangs H of a commutator C, the cylinder 68 is energized to retract the shaft 66, that is, move it to the right, as viewed in FIGURES 1 and 2, whereupon the switch operating arm 64 moves to the right causing the leg portion 62 of the bracket 60 and the shield 14 to move to the right against the bias of the spring 58. The operation as described earlier with relation to FIGURES 3, 4, 5 and 6 may then take place to lay a portion of a lead wire W over a tang H. The shield control cylinder 68 is then deenergized, whereupon the spring 58 returns the shield 14 to its tang shielding position shown in FIGURES 1 and 2. The operations described above are continued until the armature core A is completely wound. The wound armature can then be removed upon retraction of the shaft 46 by the cylinder 48. The shield 14 will then occupy the dotted line position 14A in readiness to engage a new armature core.

The control of the mechanism described above may be made semi-automatic or fully automatic by the provision of suitable switches which, for example, may be mounted adjacent a switch control shaft 74 or other parts thereof. For example, a switch actuator 76 is shown engaged with a schematically illustrated switch 78 in FIGURE 2, the actuator 76 being fixedly mounted on the shaft 66. If desired, a loading track (not shown) could be provided to advance armature cores into the area of the pad 34.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

1. In a method of winding an armature core fixedly mounted on a shaft upon which a commutator is also mounted, the armature core having a plurality of circumferentially spaced radial slots and the commutator having a plurality of circumferentially spaced lead receiving tangs, the method including the steps of: supporting the shaft with the armature core in an initial position adjacent a flier and with a pair of said slots in position to receive a coil wound by said flier; winding a coil by said flier in said pair of slots while shielding the tangs by a movable shield overlying a portion of the commutator; stopping the flier with a lead wire extending from the wound coil, said lead projecting out of one of said pair of slots and beside the commutator; rotating the shaft and, accordingly, the armature core and commutator from said initial position in a first direction to position a selected tang circumferentially offset from said one of said pair of slots adjacent said lead wire; thereafter exposing the tangs by removing the shield from tang shielding position; hooking a portion of said lead wire over the exposed said selected tang by moving said flier; returning the shield into tang shielding position; rotating the armature core in a direction opposite to said first direction and arresting the armature core at its initial position; indexing the armature core to a new position to present a new pair of slots in position to receive a coil wound by said flier; thereafter, with the armature core supported in said new position, winding a coil by said flier in said new pair of slots while shielding the tangs by said shield; stopping the flier with another lead wire extending out of one of said new pair of slots; rotating the shaft, armature core and commutator in said first direction to position another selected tang circumferentially offset from said one of said new pair of slots adjacent said another lead wire; exposing the tangs by removing the shield; thereafter hooking a portion of said another lead wire over another selected exposed tank by moving said flier; returning the shield into tang shielding position; and then rotating the armature core in a direction opposite to said first direction to return it to said new position.

References Cited

UNITED STATES PATENTS

| | | | |
|---|---|---|---|
| 2,306,855 | 12/1942 | Allen | 310—234 |
| 1,742,190 | 1/1930 | Apple | 29—155.53 |
| 1,772,851 | 8/1930 | Apple | 29—155.53 |
| 2,883,119 | 4/1959 | Braun | 242—13 |
| 2,535,438 | 12/1950 | McCollom | 242—13 |
| 3,002,259 | 10/1961 | Fletcher et al. | 29—155.5 |
| 3,142,890 | 8/1964 | Adams et al. | 29—155.5 |

JOHN F. CAMPBELL, *Primary Examiner.*

R. W. CHURCH, *Assistant Examiner.*

UNITED STATES PATENT OFFICE
CERTIFICATE OF CORRECTION

Patent No. 3,395,448                          August 6, 1968

Harry W. Moore

It is certified that error appears in the above identified patent and that said Letters Patent are hereby corrected as shown below:

Column 4, line 36, after "lead" insert -- wire --.

Signed and sealed this 6th day of January 1970.

(SEAL)
Attest:

Edward M. Fletcher, Jr.                          WILLIAM E. SCHUYLER, JR.
Attesting Officer                                    Commissioner of Patents